(12) United States Patent
Komm et al.

(10) Patent No.: US 9,212,460 B2
(45) Date of Patent: Dec. 15, 2015

(54) ROAD FINISHING MACHINE

(71) Applicant: ABG Allgemeine Baumaschinen-Gesellschaft mbH, Hameln (DE)

(72) Inventors: Hans-Joachim Komm, Hameln (DE); Marc Niggemann, Hameln (DE)

(73) Assignee: ABG Allgemeine Baumaschinen-Gesellschaft mBH, Hameln (DE)

( * ) Notice: Subject to any disclaimer, the term of this patent is extended or adjusted under 35 U.S.C. 154(b) by 0 days.

(21) Appl. No.: 14/382,426

(22) PCT Filed: Sep. 26, 2012

(86) PCT No.: PCT/EP2012/004025
§ 371 (c)(1),
(2) Date: Sep. 2, 2014

(87) PCT Pub. No.: WO2013/131540
PCT Pub. Date: Sep. 12, 2013

(65) Prior Publication Data
US 2015/0104256 A1    Apr. 16, 2015

(30) Foreign Application Priority Data
Mar. 6, 2012  (DE) .......................... 10 2012 004 533

(51) Int. Cl.
| E01C 19/12 | (2006.01) |
| E01C 19/48 | (2006.01) |
| B60H 1/24 | (2006.01) |
| E01C 19/00 | (2006.01) |
| B08B 15/00 | (2006.01) |

(52) U.S. Cl.
CPC  *E01C 19/48* (2013.01); *B60H 1/24* (2013.01); *E01C 19/002* (2013.01); *E01C 19/12* (2013.01); *B08B 15/00* (2013.01); *E01C 2301/50* (2013.01)

(58) Field of Classification Search
CPC ....... E01C 19/002; E01C 19/12; E01C 19/48; E01C 2301/50; B60H 1/24; B08B 15/00
USPC ............................. 404/72, 75, 105, 108, 118
See application file for complete search history.

(56) References Cited

U.S. PATENT DOCUMENTS

| 3,453,939 A | * | 7/1969 | Fairchild et al. | ........... 404/84.05 |
| 4,012,160 A | * | 3/1977 | Parker | ........................ 404/84.05 |

(Continued)

FOREIGN PATENT DOCUMENTS

| CN | 1735733 A | 2/2006 |
| EP | 0666373 A1 | 8/1995 |

(Continued)

*Primary Examiner* — Raymond W Addie
(74) *Attorney, Agent, or Firm* — Kilpatrick Townsend & Stockton LLP

(57) ABSTRACT

A road finishing machine includes a chassis supporting a driver's cab, an undercarriage, at least one drive unit, a hydraulic system, a screed, an asphalt supply arrangement comprising a storage hopper and a longitudinal conveyor conveying from the storage hopper to a transverse distributor and comprising a fumes suction system operated by a fan, comprising at least one airflow path, the exhaust line thereof comprising a suction opening above the transverse distributor and an outlet opening at a height above the driver's cab, wherein the fan is arranged in the region of the suction opening of the exhaust line of the at least one airflow path.

17 Claims, 13 Drawing Sheets

(56) References Cited

U.S. PATENT DOCUMENTS

| | | |
|---|---|---|
| 5,938,371 A | 8/1999 | Gustin |
| 6,079,901 A | 6/2000 | Banks |
| 6,152,649 A * | 11/2000 | Snyder et al. ................. 404/101 |
| 6,220,387 B1 * | 4/2001 | Hoppes et al. ................ 181/259 |
| 7,458,746 B1 * | 12/2008 | Zimmerman ................ 404/101 |
| 2013/0322964 A1 * | 12/2013 | Buschmann et al. ........... 404/77 |
| 2015/0152607 A1 * | 6/2015 | Kappel ................... E01C 19/48 404/101 |

FOREIGN PATENT DOCUMENTS

| | | |
|---|---|---|
| GB | 141769 A | 4/1920 |
| WO | WO2004/044331 A1 | 5/2004 |
| WO | WO2007/043966 A1 | 4/2007 |

* cited by examiner

ROAD FINISHING MACHINE

The invention relates to a road finishing machine according to the preamble of Claim 1.

An asphalt paving machine is disclosed in EP 0 937 182 B1 and U.S. Pat. No. 5,938,371, said asphalt paving machine being provided with a suction system for removing bituminous fumes which are emitted from the asphalt material. One noticeable disadvantage which occurs when processing asphalt is that the petroleum distillates in the asphalt tend to emit substantial amounts of hydrocarbons and other foul smelling fumes when the asphalt is heated.

To remove fumes from the asphalt on the asphalt paving machine, the known suction system has an air ducting system with a ducting part extending in the longitudinal direction and which extends along a conveyor for transporting the asphalt in the asphalt paving machine from a container to distributor augers, so that along this conveyor section and at the ends thereof fumes can be drawn into an air plenum of the ducting part and ejected via an air outlet part. The air outlet part is attached to the air plenum, is in communication therewith and extends to a height above the control station. A fan is arranged inside the air plenum in order to draw in air via the ducting part inlets and to eject air through the air outlet part. The fan is preferably a radial fan but may have any other type of conventional construction and be driven by an electrical or hydraulic motor. Such a suction system borne by the body of the asphalt paving machine is relatively cost-effective to construct. However, frequently the quantity of fumes is insufficiently minimized and the cleaning and maintenance effort is high, due to deposits in the air ducting system.

It is disclosed in WO 2004/044331 A1 to position above the distributor augers of a paver the inlets of two separate ducting systems with fans arranged in the air spaces. However, once again the quantity of fumes is often insufficiently minimized here and the cleaning and maintenance effort is in turn high, due to deposits in the air ducting system.

A fume processor is disclosed in U.S. Pat. No. 5,443,325, in which the fumes are combusted in the engine of a paver or processed in a different manner in order to remove or reduce the noxious components of the fumes. Such systems, however, increase the maintenance costs and the combustion of fumes in the engine has proved detrimental to the operating life of the engine.

It is the object of the invention, therefore, to provide a road finishing machine with a suction system for noxious fumes when processing asphalt, the efficiency thereof in minimizing the quantity of fumes, in particular bitumen fumes, which could harm the operator of the machine being improved and at the same time said suction system being cost-effective to construct and to maintain.

This object is achieved by the features of Claim 1.

As a result, a road finishing machine is provided with a suction system for fumes, in particular bitumen fumes, which ensures a relatively low-loss suction and as a result increases the quantity of suctioned fumes. The flow velocity is increased, as flow losses in the ducting system of the fumes suction system are minimized, with the result that the deposit of particles from the fumes is substantially avoided. The maintenance cost is thereby reduced. The exhaust line may thus be reduced to an exhaust pipe extending upwards from the fan in a substantially vertical direction.

The inventors of the present invention have recognised that most fumes are produced when the asphalt is discharged from the longitudinal conveyor onto the transverse distributor. The longitudinal conveyor generally comprises one or two transport belts which drop the asphalt into the transverse distributor, resulting in a thorough mixing which causes an increased emission of fumes, in particular bitumen fumes. Asphalt is known to be a natural or manufactured mixture of the binding agent, bitumen, obtained from crude oil and aggregate which is used in road construction. By means of the suction effect of the fan according to the invention, the fumes rising from the asphalt are thus captured there together with ambient air and suctioned through the suction opening where the major part of fumes is produced.

Moreover, it is achieved that the fumes flowing through the fan from below into the exhaust line also entrain ambient air on the periphery thereof, and said ambient air flows therewith into the suction opening. This has the result that, in addition to the fumes, a desirable, not inconsiderable quantity of ambient air which is more or less mixed with fumes is also suctioned therewith via the exhaust line. This suction flow may be adjusted by the output of the fan and/or the opening width of the suction opening.

A further great advantage is that the suction system according to the invention does not affect the accessibility in the region above the transverse distributor, in particular the distributor augers, and additionally the view onto the transverse distributor from the driver's cab is not obscured. The fan may be positioned below a platform of the driver's cab and thus moved out of the field of view.

As the fan is arranged on the inlet side of the exhaust line in the region of the suction opening, suction funnels or other suction lines, which are provided when the fan is arranged at a distance from the suction opening in the airflow path, are dispensed with. The considerable cleaning effort for these suction lines is thus dispensed with.

Preferably, the suction opening is integrated in a cover which results in the fumes rising from the transverse distributor being brought together so as to promote the flow. The cover may be designed to be plate-shaped and/or curved in order to create a retrieval effect of the fumes to be suctioned. The radius of curvature is selectable to this end.

Further advantages and embodiments of the invention may be derived from the following description and the dependent claims.

The invention is described in more detail hereinafter with reference to the exemplary embodiments shown in the accompanying drawings, in which:

FIG. 1 shows schematically a side view of a road finishing machine with a fumes suction system, in particular for bitumen fumes, FIG. 2 shows schematically a perspective view from below of the road finishing machine according to FIG. 1 without a screed, FIG. 3 shows schematically a rear view of the road finishing machine according to FIG. 2, FIG. 4 shows schematically the rear view of the road finishing machine according to FIG. 3 with suction flows, FIG. 5 shows schematically a perspective plan view of parts of the fumes suction system according to FIG. 1, FIG. 6 shows partially a view from below of the fumes suction system according to FIG. 5, FIG. 7 shows schematically a perspective plan view of parts of a second exemplary embodiment of a fumes suction system, FIG. 8 shows partially a view from below of the fumes suction system according to FIG. 7, FIG. 9 shows schematically a perspective plan view of parts of a third exemplary embodiment of a fumes suction system, FIG. 10 shows partially a view from below of the fumes suction system according to FIG. 9, FIG. 11 shows schematically a perspective plan view of parts of a fourth exemplary embodiment of a fumes suction system, FIG. 12a and FIG. 12b show schematically a perspective plan view of parts of a fifth exemplary embodiment of a fumes suction system.

FIG. 1 to FIG. 3 show a road finishing machine comprising a chassis 2 supporting a driver's cab 1, an undercarriage 3, at least one drive unit 4, a hydraulic system, a screed 5, an asphalt supply arrangement comprising a storage hopper 6 and a longitudinal conveyor 8 conveying from the storage hopper 6 to a transverse distributor 7. This is a conventional design for a paver. The undercarriage 3 is generally a crawler undercarriage but may also be a wheeled undercarriage or any other undercarriage. The longitudinal conveyor 8 preferably comprises two conveyor belts extending in parallel in order to be able to feed separately a right-hand part and a left-hand part of the transverse distributor. The transverse distributor 7 is preferably configured as a distributor auger with an auger drive 9 preferably arranged centrally.

The road finishing machine further comprises a fumes suction system 10 operated by a fan, comprising at least one airflow path X, the exhaust line 11 thereof comprising a suction opening 12 above the transverse distributor 7 and an outlet opening 18 at a height above the driver's cab 1. This fumes suction system 10 serves for suctioning, in particular, bituminous fumes, smoke and the like.

The fan operated fumes suction system 10 has a fan 13 which is arranged in the region of the suction opening 12 of the exhaust line 11 of the at least one airflow path X. The fan 13 preferably has a freestanding suction nozzle which makes a suction area as a suction opening 12. According to an exemplary embodiment, not shown, a stub nozzle may be arranged upstream of the suction opening 12 in order to be able to influence the suction behaviour around the suction opening 12.

As FIG. 2 shows, the suction opening 12 is preferably round or polygonal. The diameter of the suction opening 12 preferably corresponds substantially to the diameter of the exhaust line 11. The diameter of the suction opening 12 and thus preferably the nominal width of the suction nozzle and outlet nozzle of the fan 13 range, for example, from 100 to 200 mm. Alternatively, the diameter of the suction opening 12 may be designed to be larger than the diameter of the exhaust line 11. Deviations of up to 50% may have advantageous effects here.

The fan 13 preferably has an axially suctioning fan impeller with a radial air outlet. The fan 13 preferably operates at an output of 1000 to 3000 $m^3/h$ air volume flow. The output may be selectable in order to be able to influence noise pollution which could be emitted by a fan 13 running too rapidly. The fan 13 may be driven electrically or hydraulically.

As FIG. 1 to FIG. 4 show, for forming a suction path length for the fumes suction system, the vertical spacing between the suction opening 12 and an upper side of the transverse distributor 7 is preferably more than 80 cm, in particular more than 90 cm. As FIG. 4 shows, a flow field Y is thus produced from the transverse distributor 7 to the suction opening 12 of the fumes suction system 10, so that the ambient air, which may contain residual fumes, is also entrained, and whereby the efficiency of the fumes suction system according to the invention is improved.

The fan 13 is able to be attached to the chassis 2 of the road finishing machine such that it is able to be positioned below a platform 14 of the driver's cab 1 and thus is arranged outside the field of view of an operator onto the transverse distributor 7. The platform 14 may in this case also be used as a deflector wall for airflows.

As FIG. 1 to FIG. 4 also show, the transverse distributor 7 has a right-hand and a left-hand portion to each of which an airflow path X as described above, is assigned. The fumes suction system 10 may have a selectable number of airflow paths X each of which having at least one suction opening 12, a fan 13 and an exhaust line 11. The number is able to be selected as required and the operation of a plurality of flow paths X is able to be controlled electronically in an adjustable manner relative to one another.

FIG. 5 and FIG. 6 show the fumes suction system 10 with two airflow paths X in an enlarged view. Drive units for the fan 13 have not been shown. These figures additionally illustrate that the exhaust lines 11 may extend substantially vertically upwards and thus the airflow path X may be kept short.

FIG. 7 and FIG. 8 show an embodiment of the invention in which the suction opening 12 is integrated in a cover 15. The cover 15 forms a deflector plate which may be designed to be planar or curved. The cover 15 is preferably rectangular in a vertical projection thereof.

FIG. 9 and FIG. 10 show an embodiment of the invention in which the respective fan 13 is encased by a fan housing 16 which may be arranged on the chassis 2.

Figure 1:
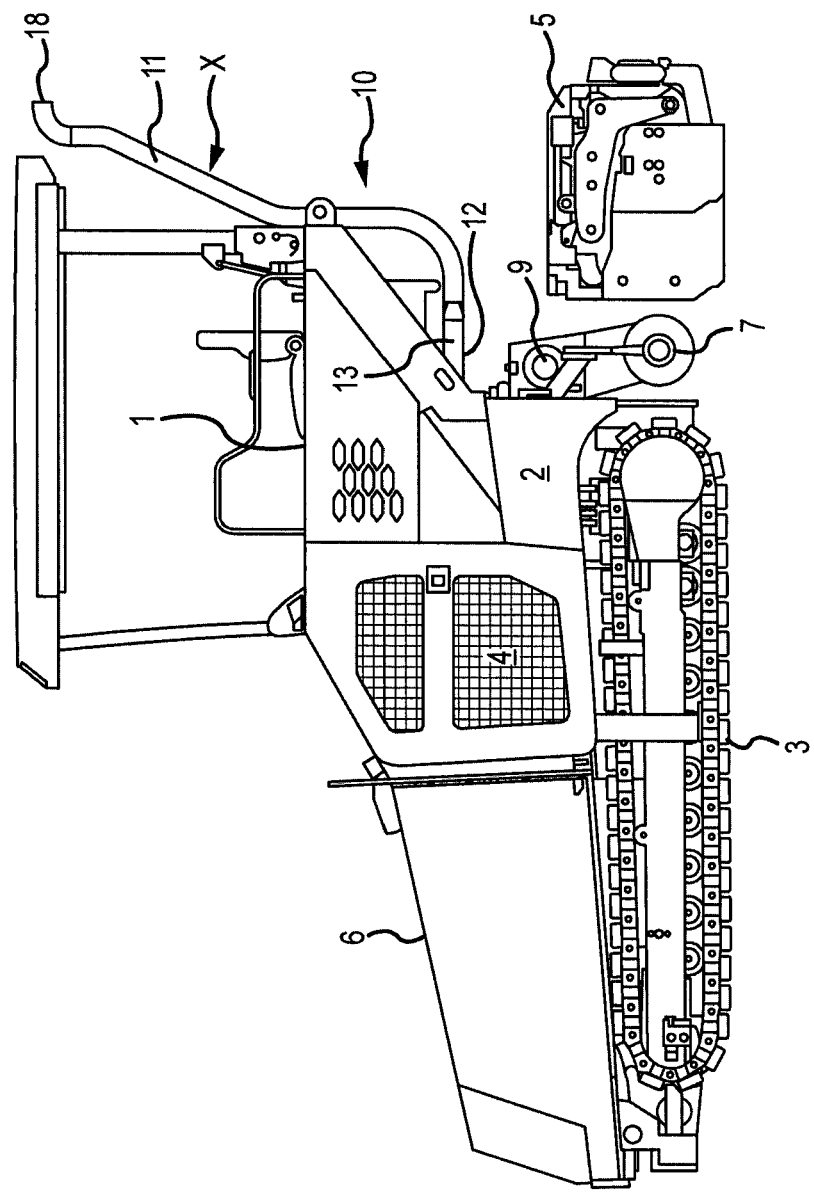
Figure 2:
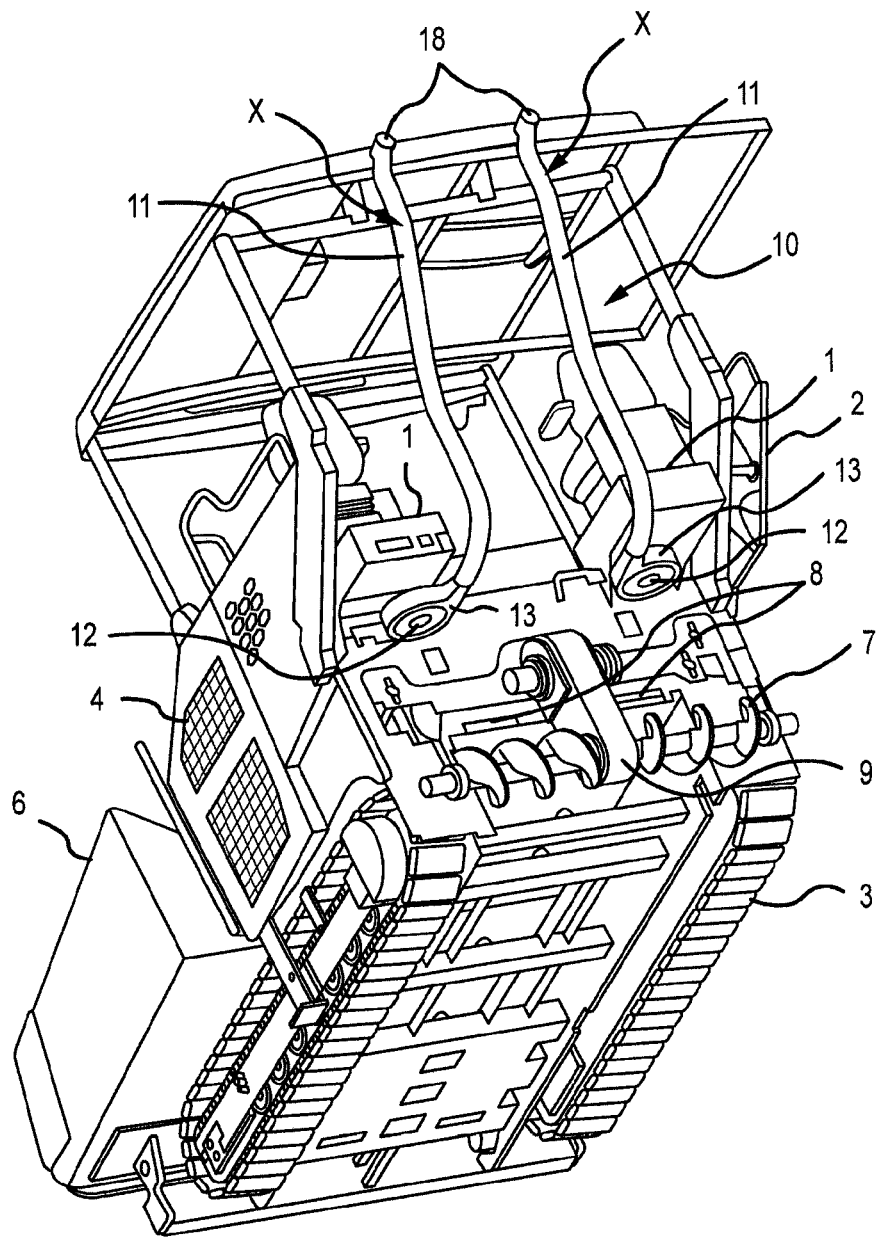
Figure 3:
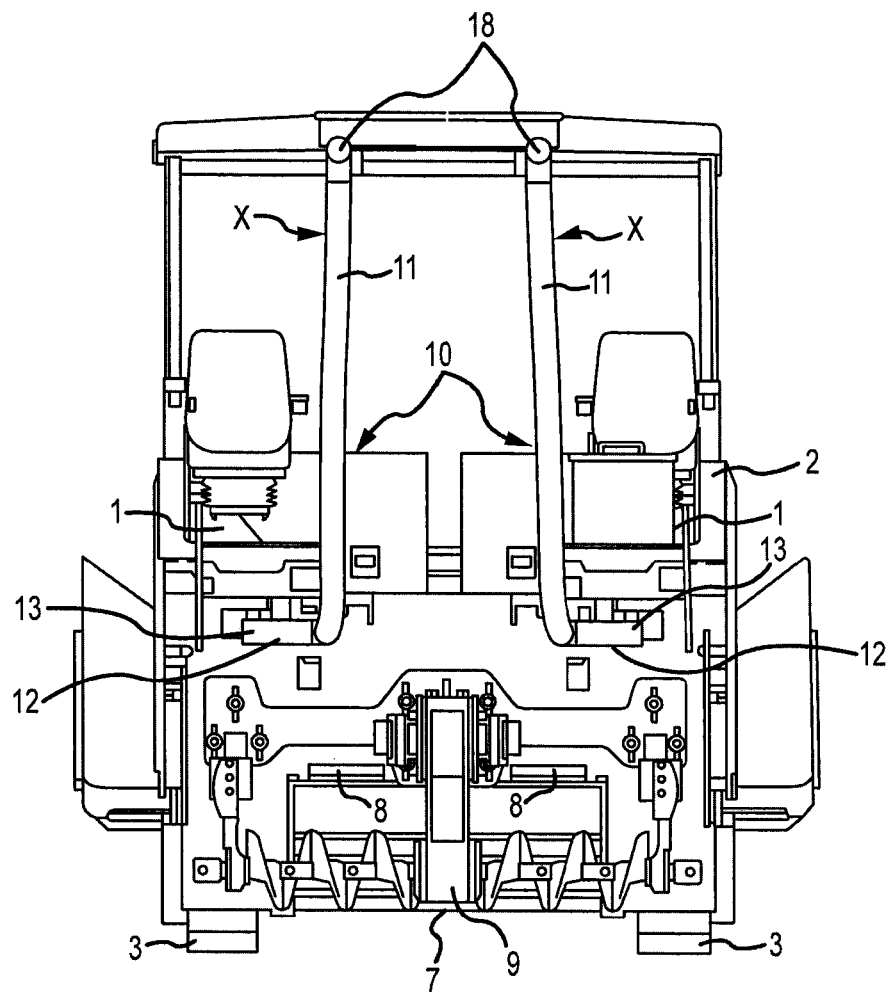
Figure 4:
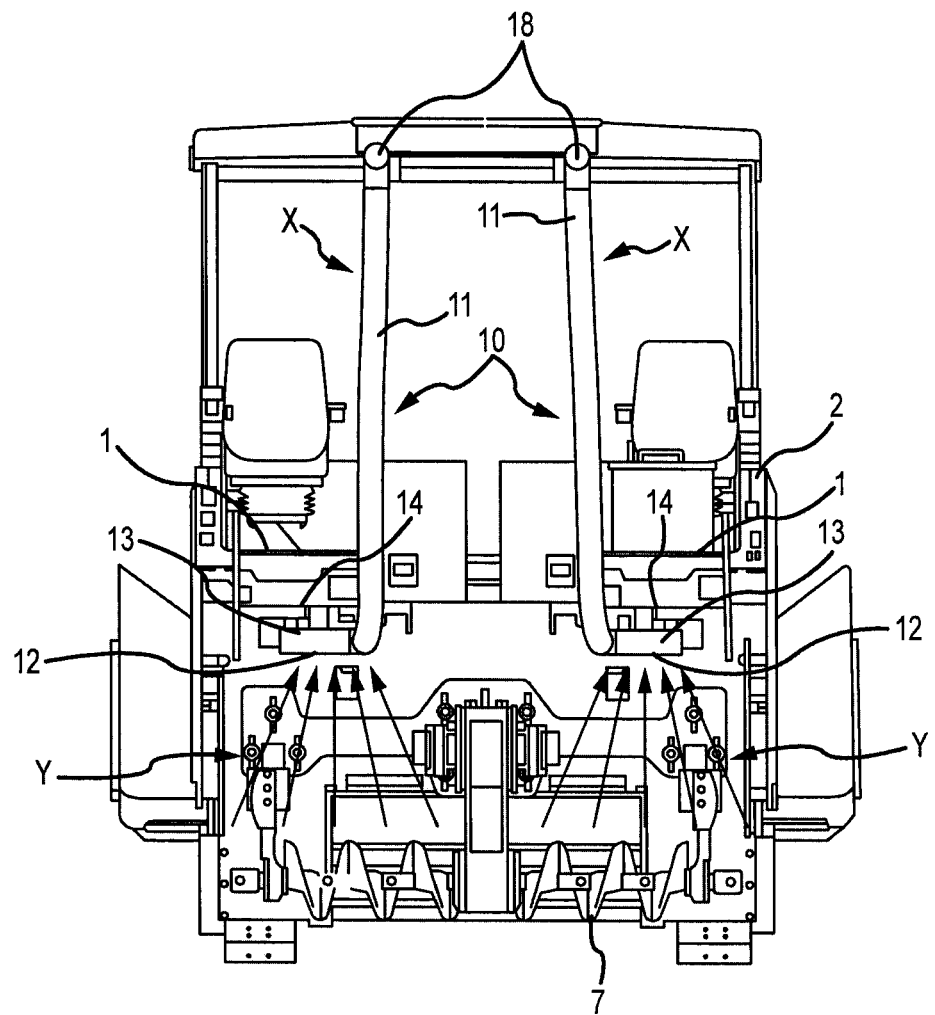
Figure 5:
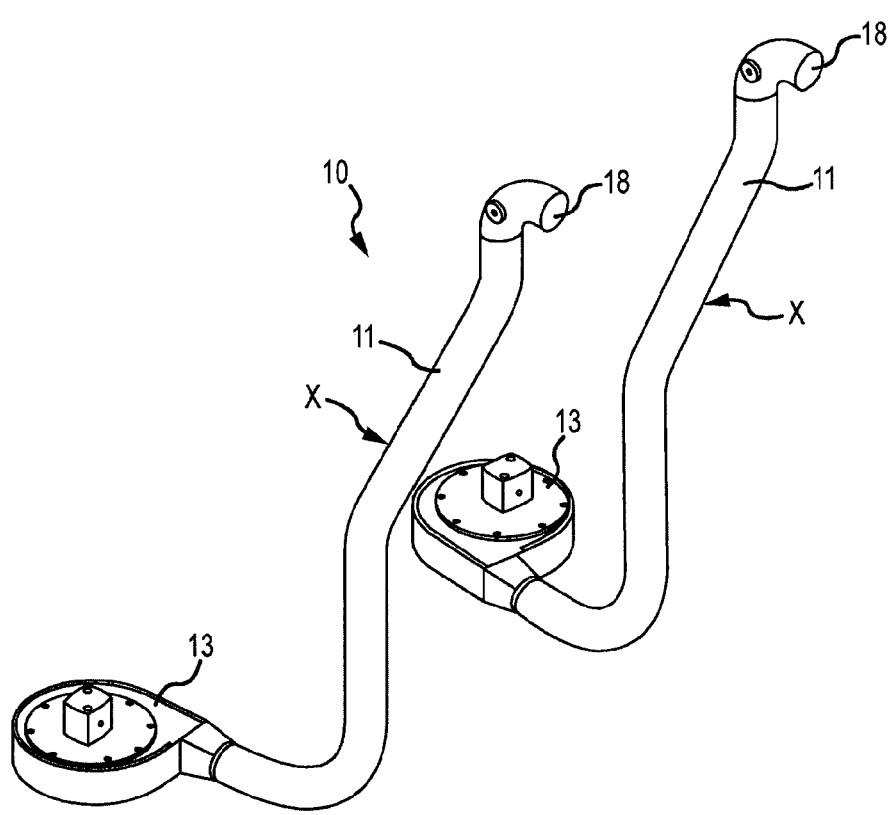
Figure 6:
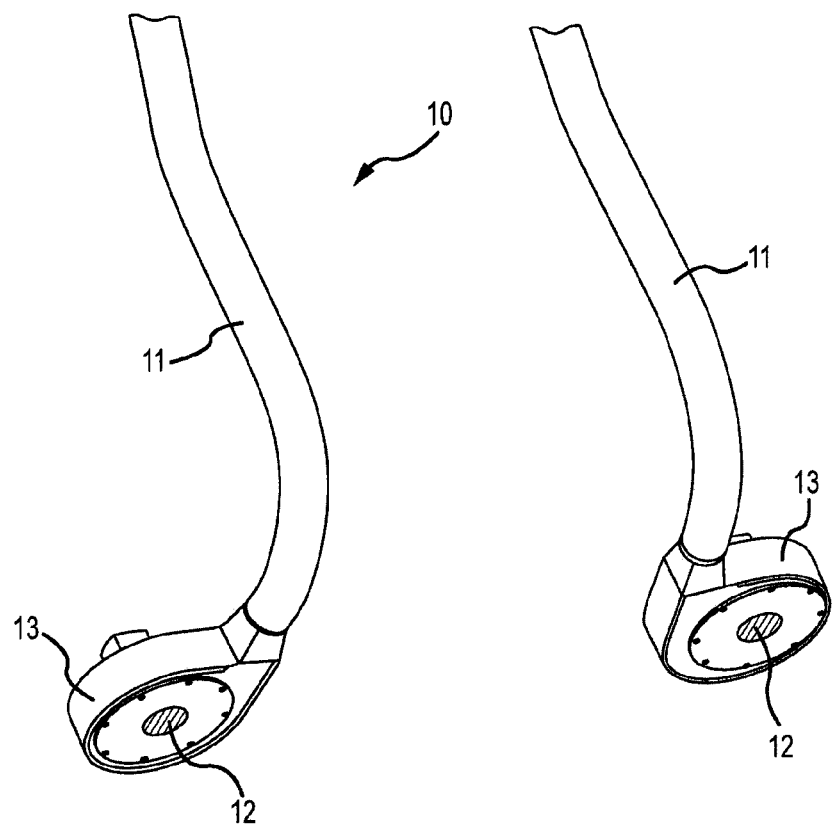
Figure 7:
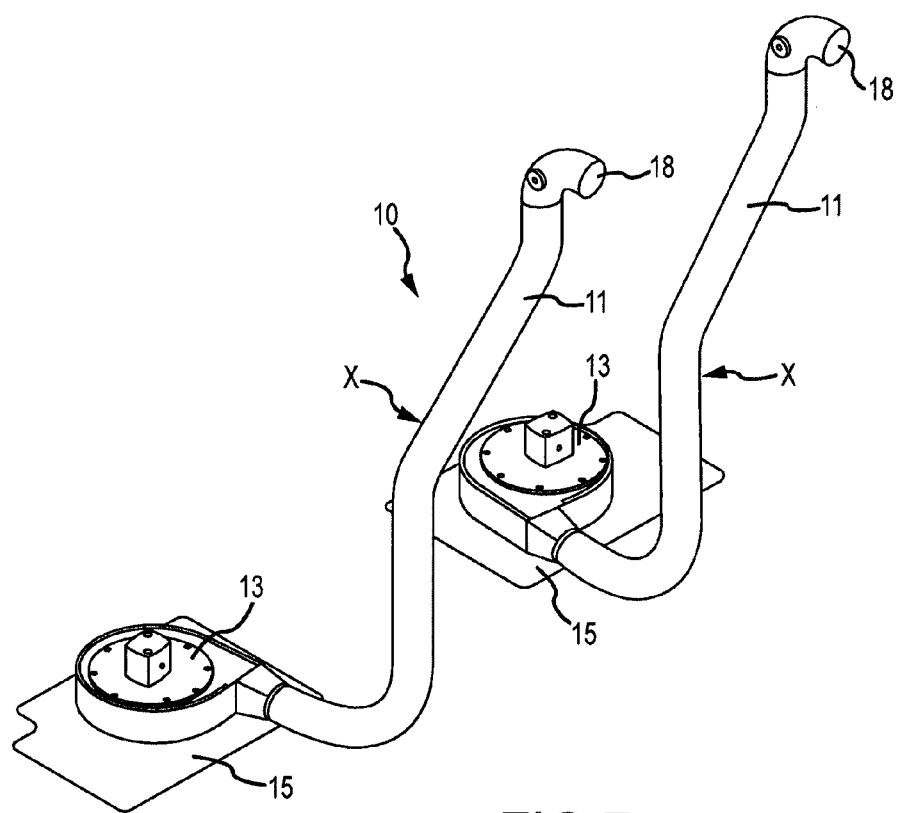
Figure 8:
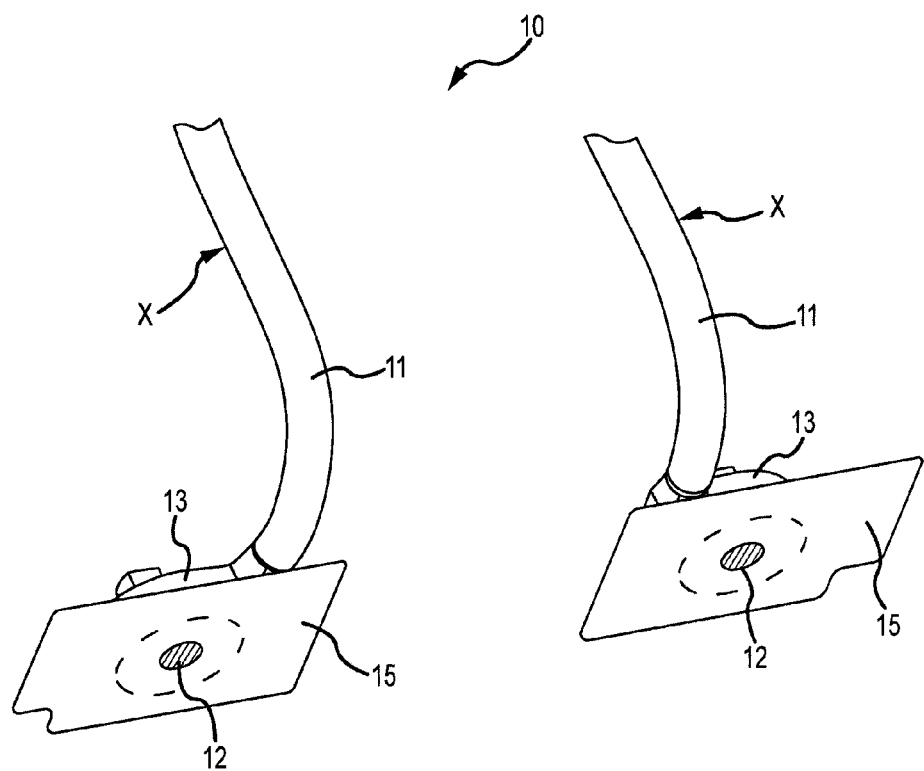
Figure 9:
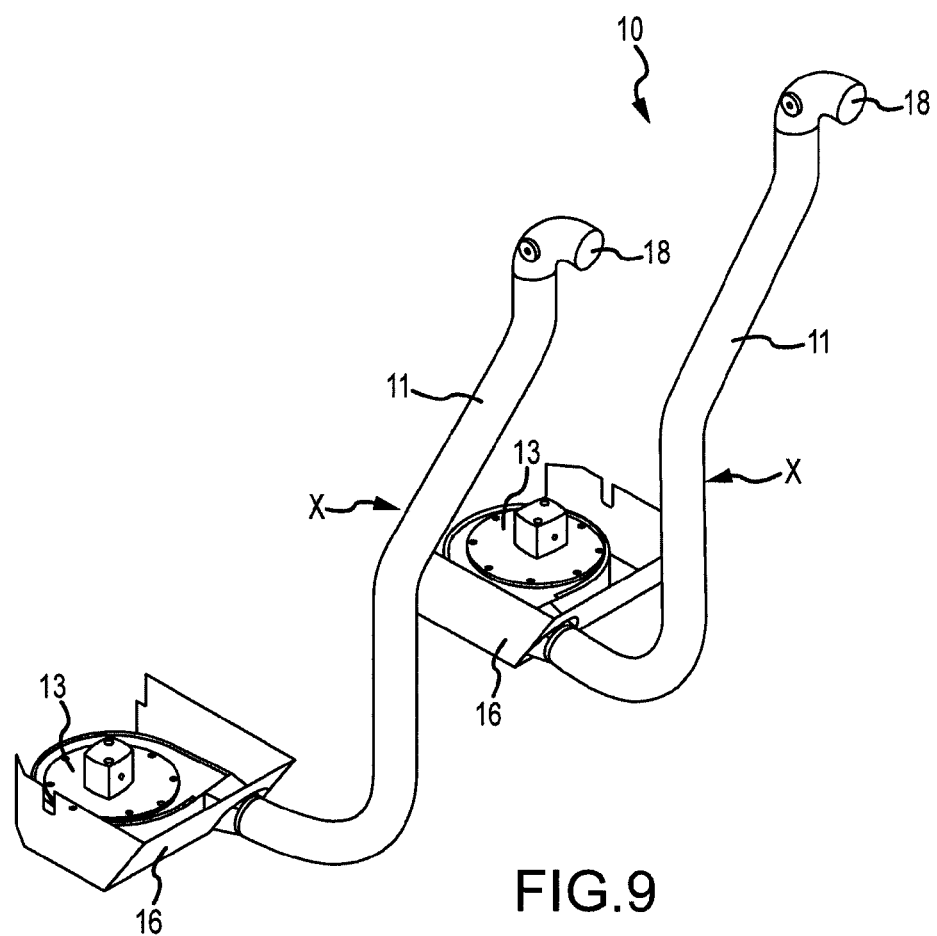
Figure 10:
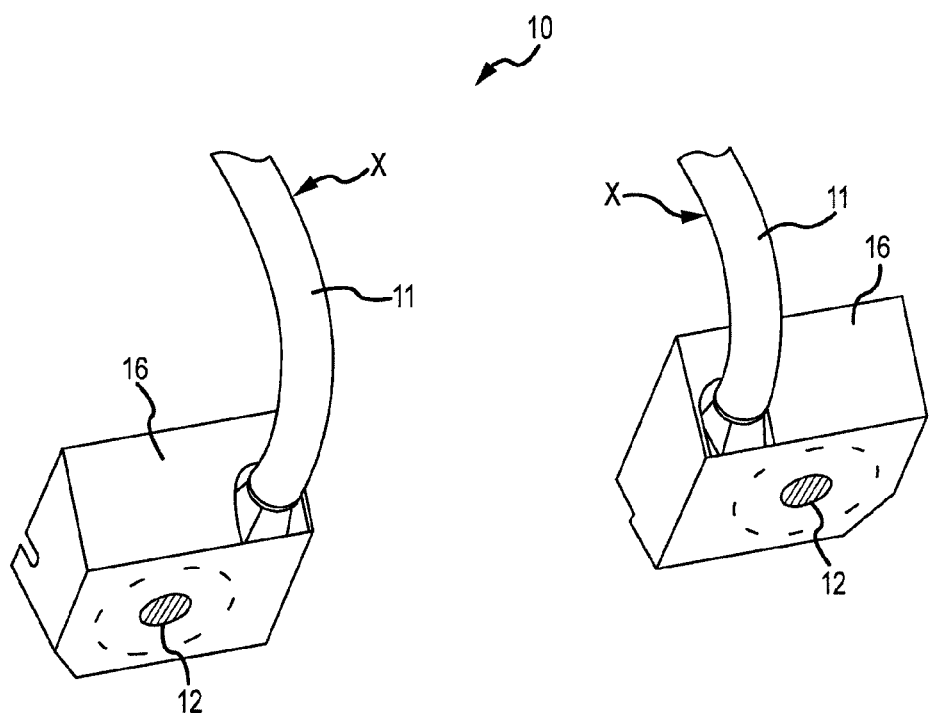
Figure 11:
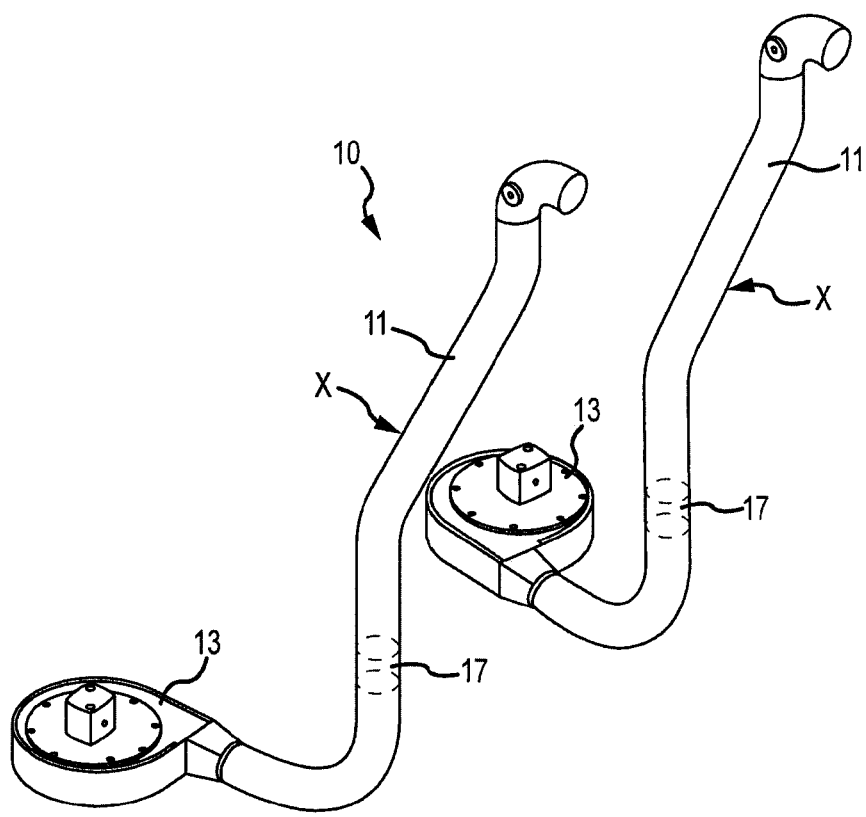
FIG. 11 shows an embodiment of the invention in which a filter element 17 and/or a sound damper is arranged in the airflow path X downstream of the suction opening 12.
Figure 12A:
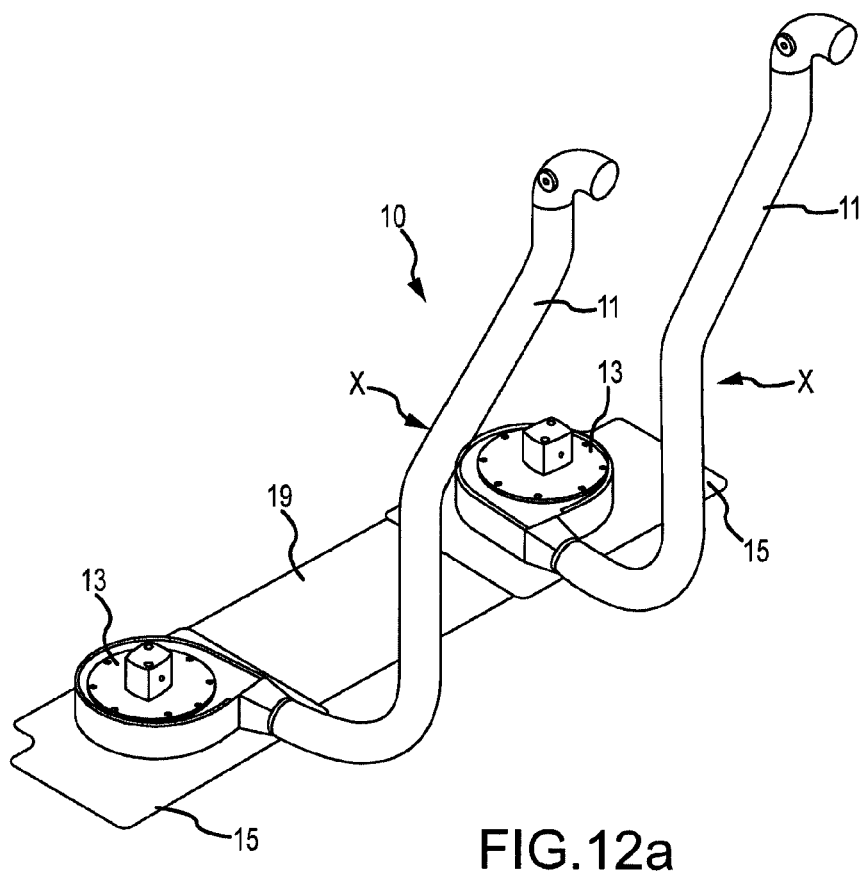
FIG. 12a shows an embodiment of the invention in which a transparent intermediate cover 19 is able to be positioned between the covers 15.
Figure 12B:
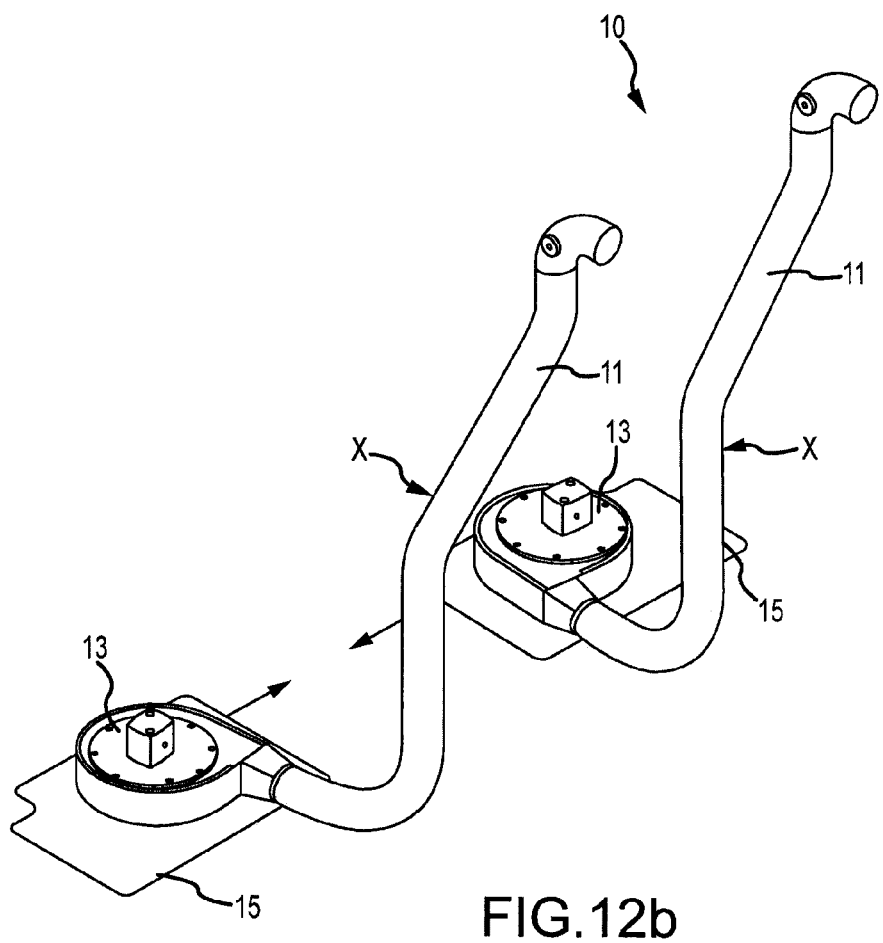
FIG. 12b shows an embodiment of the invention in which the suction openings 12 of the two airflow paths X may be integrated in covers 15 which are retained in a displaceable manner relative to one another and, in particular, are able to be pulled apart in a telescopic manner in order to alter a spacing therebetween.

The invention claimed is:

1. Road finishing machine comprising a chassis supporting a driver's cab, an undercarriage, at least one drive unit, a hydraulic system, a screed, an asphalt supply arrangement comprising a storage hopper and a longitudinal conveyor conveying from the storage hopper to a transverse distributor and comprising a fumes suction system operated by a fan, comprising at least one airflow path, the exhaust line thereof comprising a suction opening above the transverse distributor and an outlet opening at a height above the driver's cab, wherein the fan is arranged in the region of the suction opening of the exhaust line of the at least one airflow path, and wherein the fan comprises a freestanding suction nozzle which makes a suction area as a suction opening.

2. Road finishing machine according to claim 1, wherein the suction opening is round or polygonal.

3. Road finishing machine according to claim 1, wherein the diameter of the suction opening corresponds substantially to the diameter of the exhaust line.

4. Road finishing machine according to claim 1, wherein the suction opening is integrated in a cover.

5. Road finishing machine according to claim 4, wherein the cover is rectangular in a vertical projection thereof.

6. Road finishing machine according to claim 1, wherein the nominal width of the exhaust line ranges from 100 to 200 mm.

7. Road finishing machine according to claim 1, wherein the fan has an axially suctioning fan impeller with a radial air outlet.

8. Road finishing machine according to claim 1, wherein the fan operates at an output of 1000 to 3000 m³/h air volume flow.

9. Road finishing machine according to claim 1, wherein for forming a suction path length the vertical spacing between the suction opening and an upper side of the transverse distributor is more than 80 cm.

10. Road finishing machine according to claim 1, wherein a filter element is arranged in the airflow path downstream of the suction opening.

11. Road finishing machine according to claim 1, wherein the fan is driven electrically or hydraulically.

12. Road finishing machine according to claim 1, wherein the transverse distributor has a right-hand and a left-hand portion to each of which an airflow path operated by a fan is assigned.

13. Road finishing machine according to claim 12, wherein the suction openings of the two airflow paths are integrated in covers between which a transparent intermediate cover is able to be positioned.

14. Road finishing machine according to claim 13, wherein the suction openings of the two airflow paths are able to be integrated in covers which are retained in a displaceable manner relative to one another.

15. Road finishing machine according to claim 1, wherein the respective fan is encased and arranged on the chassis.

16. Road finishing machine comprising a chassis supporting a driver's cab, an undercarriage, at least one drive unit, a hydraulic system, a screed, an asphalt supply arrangement comprising a storage hopper and a longitudinal conveyor conveying from the storage hopper to a transverse distributor and comprising a fumes suction system operated by a fan, comprising at least one airflow path, the exhaust line thereof comprising a suction opening above the transverse distributor and an outlet opening at a height above the driver's cab, wherein the fan is arranged in the region of the suction opening of the exhaust line of the at least one airflow path, wherein the transverse distributor has a right-hand and a left-hand portion to each of which an airflow path operated by a fan is assigned, and wherein the suction openings of the two airflow paths are integrated in covers between which a transparent intermediate cover is able to be positioned.

17. Road finishing machine comprising a chassis supporting a driver's cab, an undercarriage, at least one drive unit, a hydraulic system, a screed, an asphalt supply arrangement comprising a storage hopper and a longitudinal conveyor conveying from the storage hopper to a transverse distributor and comprising a fumes suction system operated by a fan, comprising at least one airflow path, the exhaust line thereof comprising a suction opening above the transverse distributor and an outlet opening at a height above the driver's cab, wherein the fan is arranged in the region of the suction opening of the exhaust line of the at least one airflow path, wherein the transverse distributor has a right-hand and a left-hand portion to each of which an airflow path operated by a fan is assigned, and wherein the suction openings of the two airflow paths are able to be integrated in covers which are retained in a displaceable manner relative to one another.

* * * * *